J. C. COOK AND H. E. AUSTIN.
BAIL FOR TIMBER CARS.
APPLICATION FILED SEPT. 28, 1921.
1,428,474.
Patented Sept. 5, 1922.
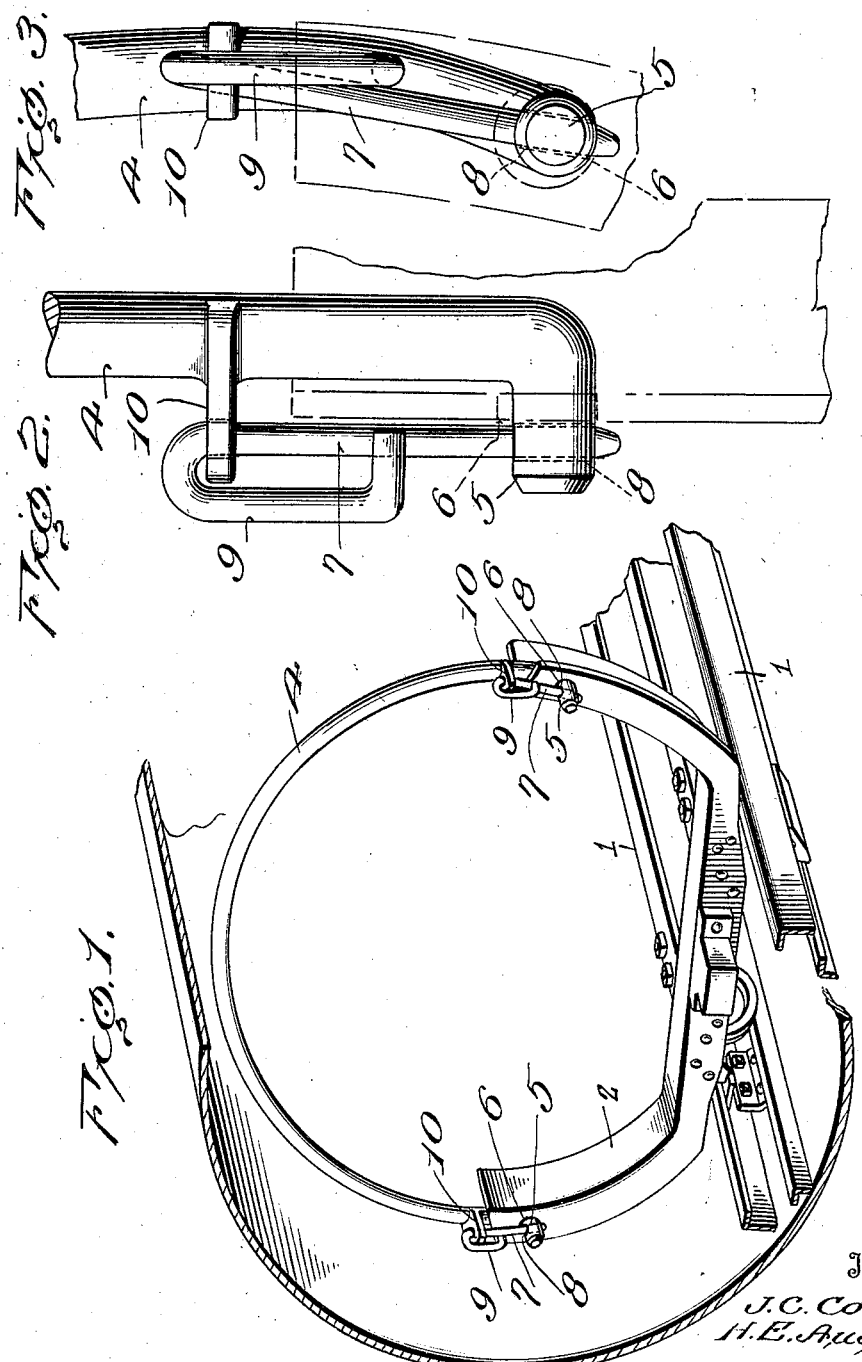

Patented Sept. 5, 1922.

1,428,474

UNITED STATES PATENT OFFICE.

JESSE C. COOK, OF JEFFERSONVILLE, INDIANA, AND HAROLD E. AUSTIN, OF LOUISVILLE, KENTUCKY, ASSIGNORS TO AMERICAN CREOSOTING COMPANY, OF LOUISVILLE, KENTUCKY, A CORPORATION OF INDIANA.

BAIL FOR TIMBER CARS.

Application filed September 28, 1921. Serial No. 503,815.

*To all whom it may concern:*

Be it known that we, JESSE C. COOK, of Jeffersonville, in the county of Clark and State of Indiana, and HAROLD E. AUSTIN, of Louisville, in the county of Jefferson and State of Kentucky, citizens of the United States, have invented a certain new and useful Improvement in Bails for Timber Cars; and we do hereby declare the following to be a full, clear, and exact description of the invention, such as will enable others skilled in the art to which it appertains to make and use the same.

Our invention relates to timber cars for wood impregnating cylinders and particularly to the bails used with such cars for limiting the amount of timber loaded thereon to prevent it from contacting with the cylinder shaft. In Letters Patent numbered 805,214, granted to Cuthbert B. Lowry and Richard Bernhard, November 21, 1905, there is shown a car of this type having rigid bails extending transversely above the car, each bail having angular ends fitting in openings in the ends of upwardly curved sills of the car, the bails being detachably connected with these sills by locking pins which are looped at one end to hug the bail and have a sliding action thereon, a transversely extending stud preventing the pins from sliding off the bails when the latter are removed.

In the use of the locking means for the bails as shown in the patent, difficulty is sometimes experienced in removing the locking pin due to its being wedged under the material loaded on the car, and such locking pin of the patent has to be raised sufficiently far to clear the end of the sill to permit the bail to be detached. Furthermore, in the construction shown in the patent, there is danger of the bail breaking at the point where it is bored to receive the stud which holds the locking pin on the bail.

It is the object of our invention to improve the construction of bails used with timber cars by providing simplified locking means therefor which will be free of the objectionable features of the bail shown and described in the before noted patent.

In the drawings, Figure 1 shows in perspective view a timber car equipped with my improved bail. Figure 2 is a view in side elevation of one end of a bail with the car sill shown in dotted lines. Figure 3 is a view at right angles to Figure 2.

Timber cars are preferably composed of two longitudinal side sills 1 and two transverse end sills 2, the latter being curved to suit the shape of the impregnating cylinder. The sills of the car are usually made of angle bars and are suitably connected and braced.

The bails 4 are rigid rods bent to conform to the upper portion of the impregnating cylinder, the ends 5 of the bails being angularly disposed and adapted to be projected through apertures 6 in the vertically disposed portions of the sills. The bails are locked in position on the sills by pins 7, the free ends extending through an opening 8 in the ends of a bail. Each of these locking pins has a looped portion 9, the end forming the loop being offset to the locking end of the pin. This looped portion is linked with a laterally projecting ear 10 of the bail which is in approximate parallelism with the angular end of the bail and spaced sufficiently far from such end to form a supporting medium for the pin when in locking engagement. The loop of the pin permits a relative movement of the pin in its linked engagement with the ear to give easy clearance between it and the bail end when the latter is to be detached. By the offset formation of the loop forming end of the pin all danger of the pin rotating to a position which will foul the clearance between the bail and the cylinder is avoided, and the ear for the bail is so spaced from the angle end as to provide a support for the pin close to the top of the sill, thus shortening the locking pin and materially increasing its bending resistance.

The advantages of our invention will be apparent. It is to be particularly noted that the construction described obviates all likelihood of disengagement between the pin and bail as so frequently happens where the pin is merely held to the bail by a transverse stud which may be easily jarred loose, and, further, that the construction permits of a quick detachment of the bail, the locking pin having to be raised only until the lower end clears the bail.

We claim as our invention:

1. Bails for detachable engagement with the end sills of timber cars for wood impregnating cylinders having angularly disposed ends adapted to interlock with said end sills, a laterally projecting ear adjacent each of said angular ends and a pin in linked engagement with each ear and adapted for locking connection with the angular end of said bail.

2. Bails for detachable engagement with the end sills of timber cars for wood impregnating cylinders having angularly disposed ends adapted to interlock with said end sills, each of said angular ends having an opening therethrough, a laterally projecting ear adjacent each of said angular ends and a pin in linked engagement with each ear and adapted to be projected into the opening of the complemetary angular end of said bail.

3. Bails for detachable engagement with the end sills of timber cars for wood impregnating cylinders having angularly disposed ends adapted to interlock with said end sills, said ends each having an opening therethrough, a laterally projecting ear near each angular end and in spaced relation thereto, and a pin in linked engagement with each ear and adapted for locking connection with the angular end of said bail through its opening, the loop of said pin being of a length sufficient to permit relative movement of the pin to give easy clearance between it and the bail end when the latter is being detached from the end sills.

4. Bails for detachable engagement with the end sills of timber cars for wood impregnating cylinders having angularly disposed ends adapted to interlock with said end sills, said ends each having an opening therethrough, a laterally projecting ear near each anuglar end and in spaced relation thereto, and a pin in linked engagement with each ear and adapted for locking connection with the angular end of said bail through its opening, the loop of said pin being offset from the locking end and of a length sufficient to permit relative movement of the pin to give easy clearance between it and the bail end when the latter is being detached from the end sills.

In testimony whereof we have signed this specification.

JESSE C. COOK.
HAROLD E. AUSTIN.